Aug. 17, 1965    H. J. HENDRICKSON    3,200,524
SAFETY TAIL LIGHT
Filed Aug. 31, 1964
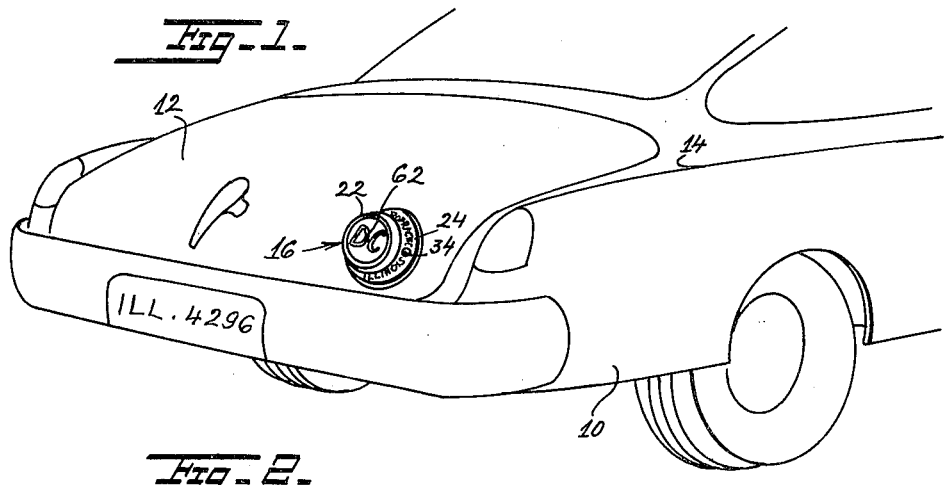
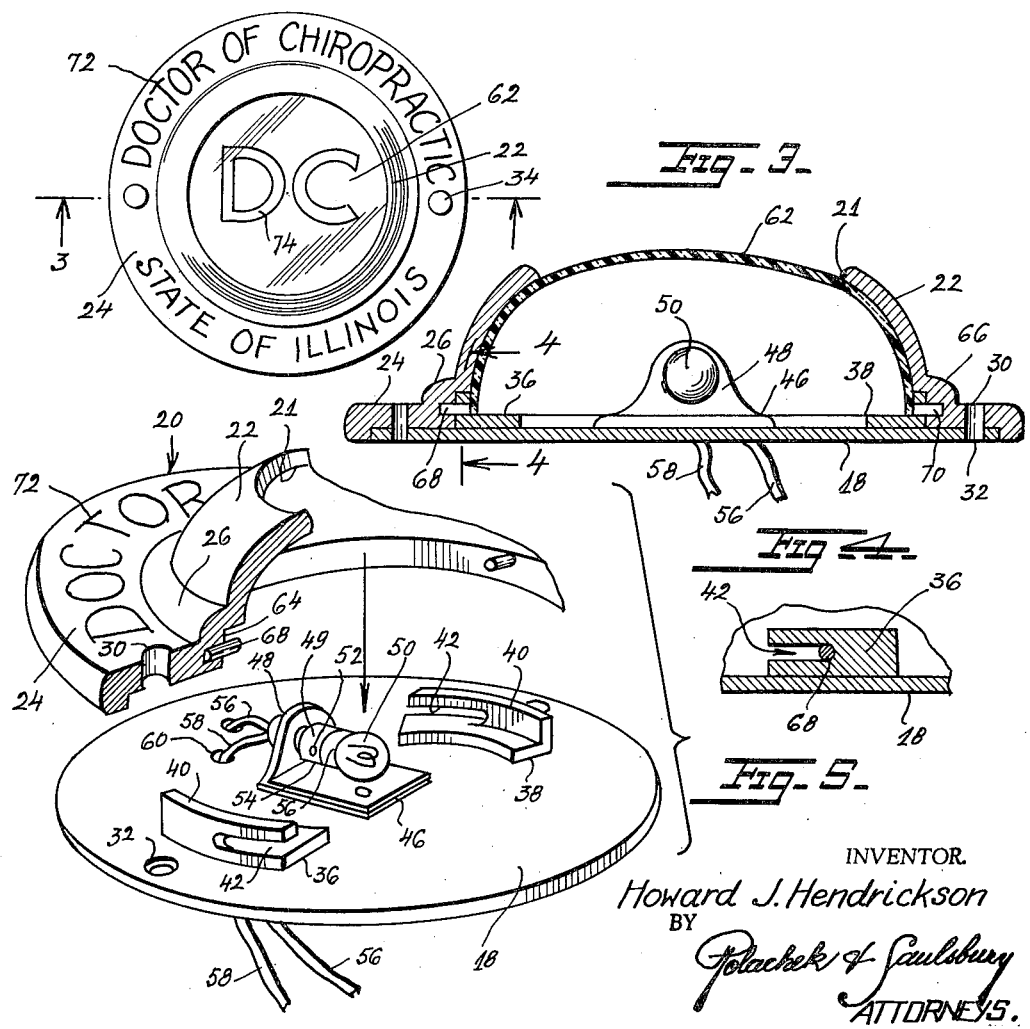
INVENTOR.
Howard J. Hendrickson
BY
Polachek & Saulsbury
ATTORNEYS.

3,200,524
SAFETY TAIL LIGHT
Howard J. Hendrickson, 1123 N. Frink St., Peoria, Ill.
Filed Aug. 31, 1964, Ser. No. 393,233
2 Claims. (Cl. 40—129)

This invention relates to a tail light suitable as a warning device for all types of automotive vehicles and particularly suitable as a night light or parking light.

A principal object of the present invention is to provide an automobile parking or night light unit that is easily assembled and mounted on the exterior of the trunk compartment of an automobile.

Another object is to provide a lens clamping and positioning means which reliably holds a circular lens reliably stationary and accurately centered and free from axial tilt in its mounting.

A further object is to provide means for automatically centering the lens in its mounting as a companion operation which is accomplished simultaneously during the clamping of the lens.

Yet another object of the invention is to provide such lens mounting means which is simple and easy to install, is adaptable to various clamping conditions and is of the durable construction.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a tail light embodying one form of the invention shown installed on the exterior of a trunk compartment of an automobile, FIG. 2 is a top plan view of the tail light removed from the automobile, FIG. 3 is a cross-sectional view taken on the line 3—3 of FIG. 2, FIG. 4 is an enlarged sectional view taken on the line 4—4 of FIG. 3.

FIG. 5 is a spread perspective view of the tail light, parts being shown broken away.

Referring now in detail the various views of the drawings shown, in FIG. 1 the rear end of an automobile 10 is illustrated with a tail light embodying one form of the invention mounted on the door 12 of the trunk compartment 14 and designated generally at 16.

The tail light 16 which is designed to serve as a night light and a parking light comprises a flat sheet metal circular base plate 18 and a casting 20 circular in plan and having a dome-shaped or curved body portion 22 terminating in an annular flange 24. The top center of the body portion is formed with a circular opening or window 21. The body portion is enlarged at its juncture with the flange and is formed with a beaded shoulder 26 thereat. The outer peripheral edge of the flange is formed with a downwardly extending flange 28 which forms a seat for the base plate 18. The flange 24 and base plate 18 are formed with opposed aligned holes 30, 32 respectively to receive a fastening element in the form of a threaded bolt 34 for fastening the tail light unit onto the door of the trunk compartment, at the rear thereof, the door being provided with holes to receive the bolts.

On opposite sides of the center of the base plate 18, there are a pair of curved plates 36 and 38 welded or otherwise suitably secured to the top surface of the base plate. Each plate has an upstanding flange 40 along the outer long edge thereof, and each flange 40 is formed with a slot 42 intersecting one end thereof, the slot in the flange of plate 36 intersecting the right hand end and the slot in the flange of plate 38 intersecting the left hand end as viewed in FIG. 5.

On the top surface of base plate 18, positioned centrally thereof between the plates 36 and 38, there is a sheet metal bracket 46, rectangular in shape and formed with an upstanding flat lug 48 at one end thereof. The lug is perforated at its center. A short socketed sleeve 49 extends radially of the lug 48 outwardly of the central perforation therein. The sleeve removably supports miniature electric light bulb 50 by means of a bayonet slot 52 formed in the sleeve coacting with a pin 54 carried by the base 56 of the bulb. A pair of conductors 56 and 58 is connected to the bulb and extends through the sleeve and perforation in the lug 48, and through a pair of holes 60, 60 in the base plate 18, the conductors being connected to the automobile battery.

The dome shaped body portion 22 seats on a dome-shaped glass lens 62, the bottom peripheral edge of the lens seating on the top surfaces of the curved plates 36 and 38. The top central portion of the lens is exposed through the opening or window 21.

On opposite sides of the body portion 22, on the inside thereof, at its enlarged portion, opposed recesses 64 and 66 are formed therein, the recesses being shaped to conform to the cross-sectional shape of the plates 36 and 38 so that the plates seat in said recesses. A pair of opposed pins 68 and 70 is embedded in the material of the body portion and project outwardly through the recesses, the pin 68 extending through the slot 42 in plate 36 and the pin 70 through the slot in plate 38. The dome shaped body portion clamps the lens 62 onto the plates preventing displacement thereof, and the pins 68 and 70 interlock with the edge walls of the grooves 42 and lock the casting onto the base plate 18. The bolts 34 also lock the casting to the base plate when the tail light is fastened by said bolts to the door of the trunk compartment.

When the tail light is removed from the door of the trunk compartment, it is merely necessary to remove the bolts and then turn the casting with pins 68 and 70, in a clockwise direction, as viewed in FIG. 5 whereupon the pins ride free of the grooves and the casting may be lifted off of the base plates.

In use, the lens 62 may be colored red to serve as a warning and advertising or identifying indicia 72 may be printed on the outer surface of the annular flange 24. Indicia 74 may also be printed on the outer surface of the lens 62.

A tail light of the type such as described is particularly desirable for professional people such as doctors to serve as a night light and parking light.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. An automotive taillight of the character described comprising a circular metallic base plate, an electric light bulb socket secured in fixed position to the upper surface of said base plate, conductor means by which said socket is adapted to be secured to an electrical source, a dome shaped translucent plastic lens, and securing means by which said lens is adapted to be concentrically clamped to the upper surface of said base plate; said securing means comprising a dome shaped metallic lens holder the inner surface of which is complementary to the outer surface of said dome shaped lens, an enlarged axially disposed opening in said holder, an outwardly extending annular flange secured to said holder about the peripheral edge thereof, and interengaging means between said base plate and said holder by which said holder is adapted to be secured to and detached from said base plate by a rotary movement of said holder; said interengaging means comprising a pair of diametrically opposed arcuate plates which are secured to and extend upwardly from said base plate outwardly of said lens and into opposed arcuate recesses formed in the inner wall of said holder, each of said arcuate plates being provided with a slot which intersects one end thereof and is disposed parallel to said base plate, and a pair of pins which are carried by said holder in position to be brought into and out of engagement with said slots by rotary movement of said holder; said base plate and said annular flange each being provided with apertures, which are adapted to align when said holder is in securing position on said base plate, for the reception of bolts by which said taillight is adapted to be secured to a vehicle and said holder is constrained against rotation with respect to said base plate.

2. An automotive taillight as defined by claim 1 in which the under surface of said annular flange is provided with an axially disposed circular recess in which said base plate is seated.

References Cited by the Examiner
UNITED STATES PATENTS

| | | | |
|---|---|---|---|
| 2,586,869 | 2/52 | Sculthorpe | 240—152 |
| 2,596,879 | 5/52 | Warren et al. | 40—129 XR |
| 2,690,552 | 9/54 | Kiibus | 40—130 XR |
| 2,853,595 | 9/58 | Baldwin | 240—152 XR |
| 2,871,342 | 1/59 | Maapes | 240—152 XR |
| 2,890,538 | 6/59 | Jentges | 40—130 |
| 2,891,140 | 6/59 | Huff | 240—41.55 |
| 2,916,607 | 12/59 | Bargman | 240—8.3 |
| 2,992,321 | 7/61 | Robbins | 240—41.55 |
| 3,145,933 | 8/64 | Dickson | 240—8.3 |

EUGENE R. CAPOZIO, *Primary Examiner.*

LAWRENCE CHARLES, *Examiner.*